US012288512B1

(12) United States Patent
LaRocca et al.

(10) Patent No.: US 12,288,512 B1
(45) Date of Patent: Apr. 29, 2025

(54) SYSTEM FOR AMBIENT LIGHT SENSING OR COMPENSATION

(71) Applicant: Apple Inc., Cupertino, CA (US)

(72) Inventors: Francesco LaRocca, Santa Clara, CA (US); Aditya B Nayak, San Jose, CA (US); Anand K Chamakura, San Jose, CA (US); Christopher M Dodson, Denver, CO (US); Guocheng Shao, Palo Alto, CA (US); Kenneth J Vampola, Los Altos, CA (US); Mahesh B Chappalli, San Jose, CA (US); Reza Tafteh, Santa Clara, CA (US); Serhan O Isikman, Redwood City, CA (US); Steven N Hanna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/100,858

(22) Filed: Jan. 24, 2023

Related U.S. Application Data

(60) Provisional application No. 63/302,990, filed on Jan. 25, 2022.

(51) Int. Cl.
*G09G 3/3208* (2016.01)

(52) U.S. Cl.
CPC ... *G09G 3/3208* (2013.01); *G09G 2320/0209* (2013.01); *G09G 2320/064* (2013.01); *G09G 2360/144* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 11,030,946 B1 * | 6/2021 | Chen | G09G 3/20 |
| 2018/0082659 A1 * | 3/2018 | Jia | G06F 3/147 |
| 2019/0220139 A1 | 7/2019 | Costa et al. | |
| 2020/0294468 A1 | 9/2020 | Hung et al. | |
| 2021/0097943 A1 * | 4/2021 | Wyatt | H10K 59/353 |
| 2021/0127471 A1 * | 4/2021 | Wang | H05B 47/11 |
| 2021/0312853 A1 * | 10/2021 | Sin | G09G 3/3233 |
| 2021/0343257 A1 * | 11/2021 | Chen | G01J 1/4204 |

OTHER PUBLICATIONS

CIE Technical Note 001: 2014, Chromacity Difference Specification for Light Sources, pp. 1-9.
Wu, J., et al, 61-1: Invited Paper: Enhanced Viewing Experience Considering Chromatic Adaptation. InSID Symposium Digest of Technical Papers, Jun. 2019, vol. 50, No. 1.

* cited by examiner

*Primary Examiner* — Amr A Awad
*Assistant Examiner* — Donna V Bocar
(74) *Attorney, Agent, or Firm* — Fletcher Yoder, P.C.

(57) ABSTRACT

An electronic display may include an ambient light sensor (ALS) located beneath an active area to sense ambient light above the active area. The ALS may have multiple response channels to perform fast sensing integration, which is synchronized with blanking periods of a pixel on the active area. An emission mask and a heat map may be generated for the ALS and used to generate a calibrated heat map for the ALS. The calibrated heat map of the ALS is used with display content to calculate a crosstalk compensation for the ALS.

22 Claims, 17 Drawing Sheets

SYSTEM FOR AMBIENT LIGHT SENSING OR COMPENSATION

CROSS-REFERENCE TO RELATED APPLICATIONS

This application claims priority to U.S. Provisional Application No. 63/302,990, filed Jan. 25, 2022, titled "SYSTEM FOR REAL-TIME COLOR SENSING," which is hereby incorporated by reference in its entirety for all purposes.

BACKGROUND

The present disclosure relates generally to wireless communication systems and devices and, more specifically, to system packaging that facilitates real-time estimation color sensing.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—such as cellular devices, televisions, handheld devices, and notebook computers—often display images and videos on an electronic display. Many electronic displays use an ambient light sensor (ALS) to identify the amount and/or color of light. An ambient light sensor senses ambient light and allows the brightness and/or color of the electronic display to be adjusted. When the ambient light sensor is located near the display pixels of the electronic display, light emitted from the display itself may be detected by the ambient light sensor. The light emitted from the display is not ambient light and could cause the ambient light sensor to incorrectly measure the ambient light.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As previously mentioned, electronic devices may include multiple chips and devices, such as a display device to display image content (e.g., pictures, video, and so forth). The display may display the content in various light environments. The display device may include an ambient light sensor (ALS) to provide a consistent viewing experience in different ambient lighting of the various environments. In particular, the ambient light sensor may sense ambient light. Based on the brightness and/or color of the ambient light, processing circuitry of the electronic device may adjust the display brightness and/or color of the image content to be displayed on the electronic display. In this way, the ambient light sensor may ensure that the content displayed on the display is visible in the various different lighting environments while reducing (e.g., optimizing) power consumption. Specifically, the ambient light sensor may sense lighting conditions of the environment to allow the color and/or brightness of the electronic display to be adjusted accordingly. However, placing the ambient light sensor so that the ambient light sensor has an unobstructed view of the environment while also conserving display area for the display to render image data on the display may be difficult. Additionally, ensuring that other display signals in the display do not interfere with ambient light signals to the ambient light sensor may also be difficult.

The present disclosure provides techniques for packaging that accommodates the ambient light sensor in the display device while providing ample display area to render the image content and/or while mitigating display crosstalk on the ambient light sensor. In particular, the ambient light sensor may be placed near and beneath or above a display, to increase display space otherwise used for dedicated ambient light sensors. Moreover, a crosstalk compensation technique may be applied to compensate for crosstalk occurring between the ambient light signal and the other display signals. Additionally, the sensing and compensation may be used to accommodate display content that may rapidly change, environments that may rapidly change, or both.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
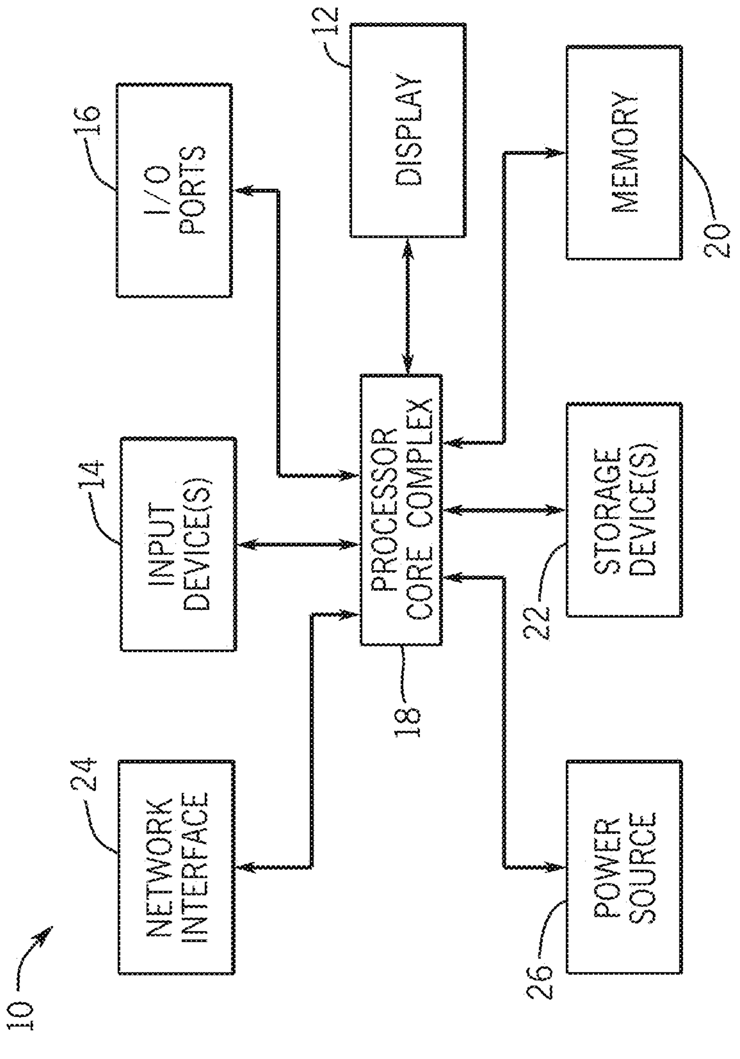
FIG. 1 is a block diagram of an electronic device, according to an embodiment of the present disclosure.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
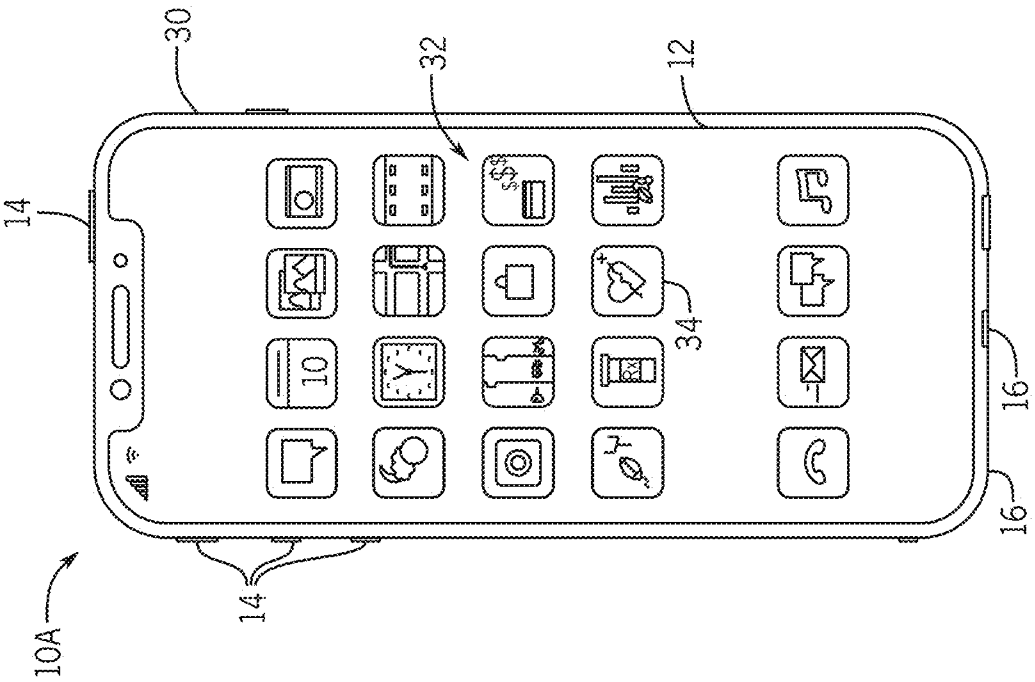
FIG. 2 is an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
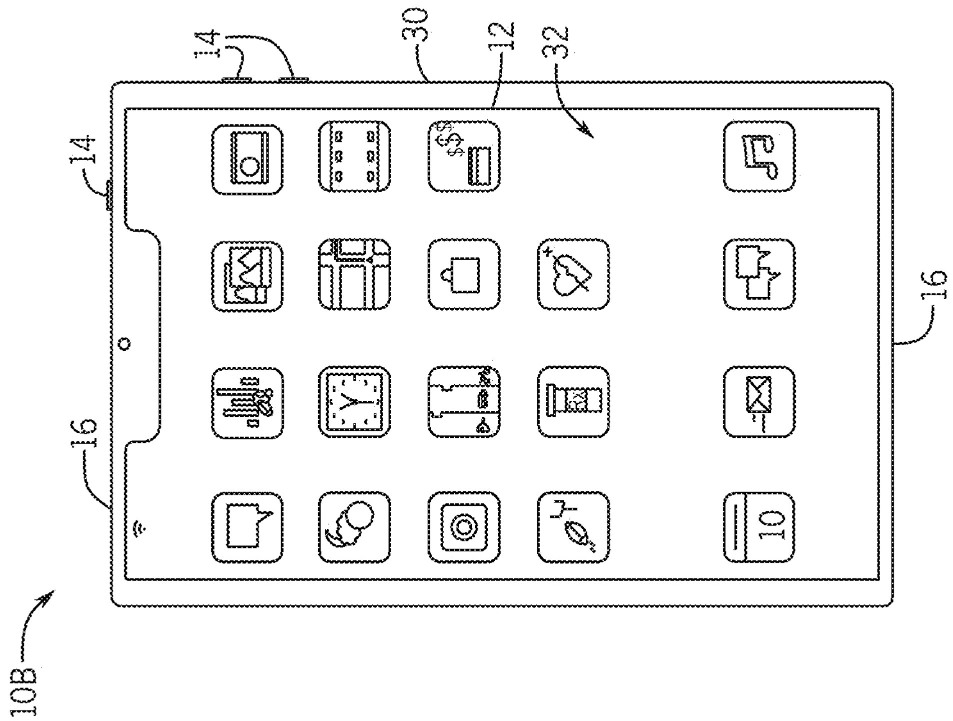
FIG. 3 is another example of the electronic device of FIG. 1, in accordance with an embodiment.
Figure 4:
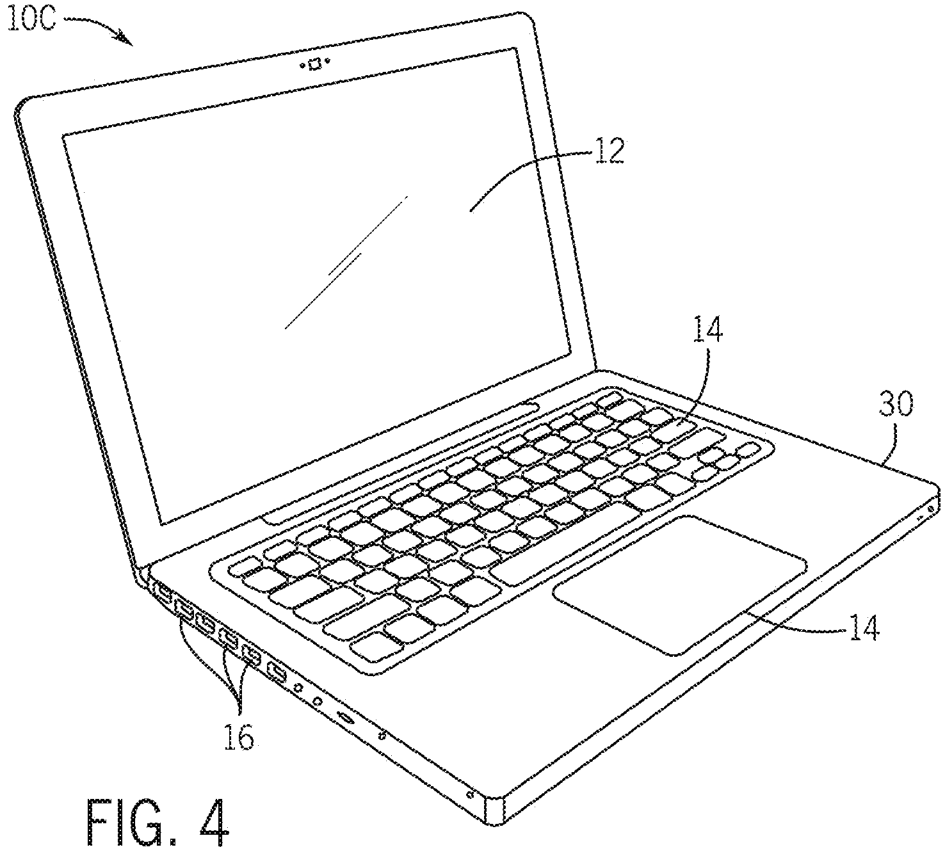
FIG. 4 is another example of the electronic device of FIG. 1, in accordance with an embodiment.
Figure 5:
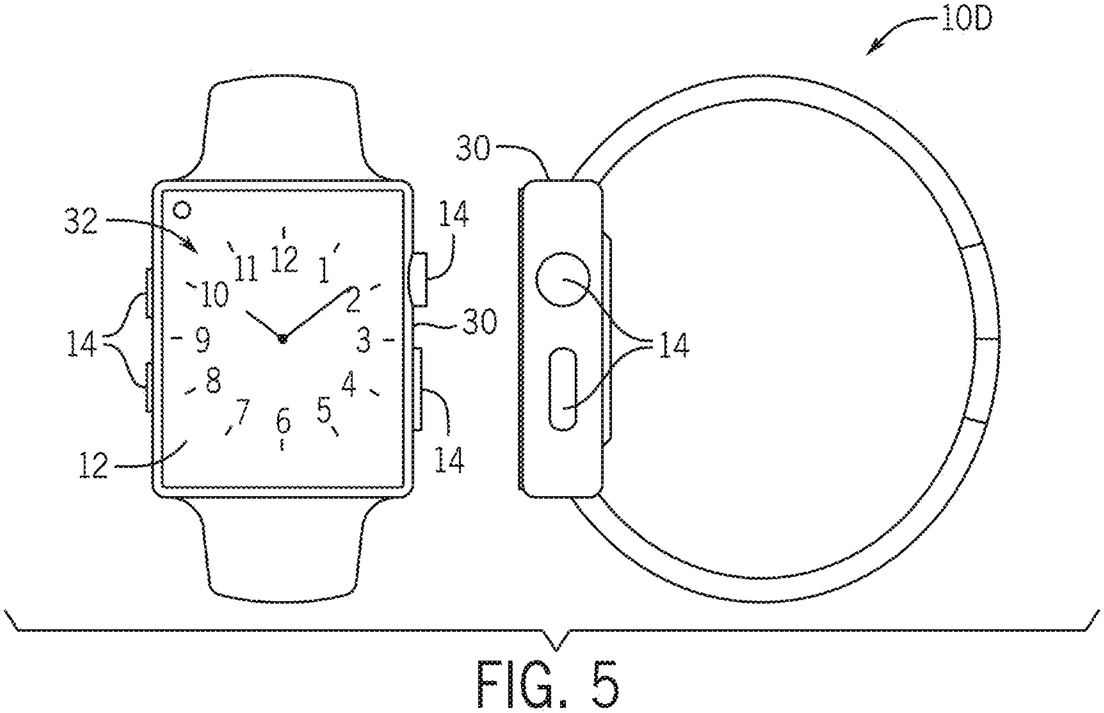
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
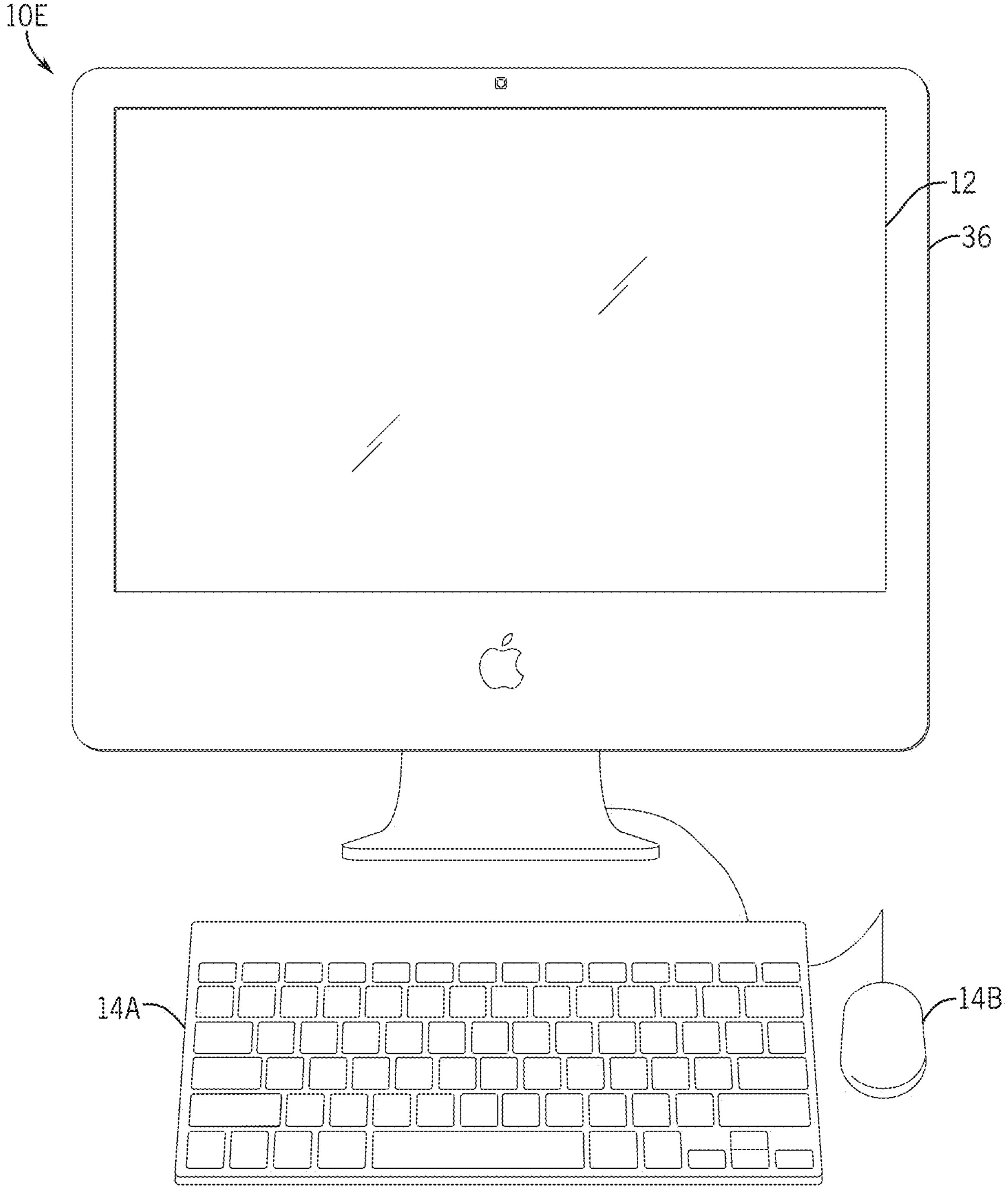
FIG. 6 is another example of the electronic device of FIG. 1, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
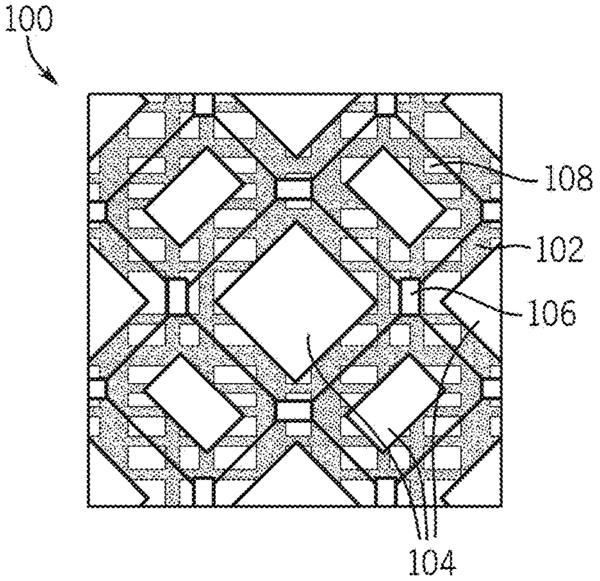
FIG. 7 is a schematic diagram of an active area of a display device, according to embodiments of the present disclosure.

With the foregoing in mind, FIG. 7 is schematic diagram of an active area 100 of a display device 12 of the electronic device 10 of FIG. 1. As shown, the active area 100 of the display may include a layout with thin film transistor (TFT) routings 102, OLED anodes 104 (e.g., red OLED anodes, green OLED anodes, blue OLED anodes), touch routings 106 for touch sensing, and open areas 108. The open areas 108 may include areas free from light-attenuating routing traces (e.g., the TFT routing 102, the touch routing 106) and OLED anodes (e.g., the OLED anodes 104). As mentioned above, the ambient light sensor may be placed beneath the active area 100 to increase display space. The amount of on-axis optical transmission through the active area 100 may be attributed to at least two factors, the "open-ratio" of the active area 100, which is the area fraction of the open areas 108 to the active area 100, and the transmission of the open areas 108. For example, when the "open-ratio" is greater, the area fraction of the open areas 108 to the active area 100 is bigger, and the active area 100 may include more areas free from light-attenuating routing traces. The "open ratio" may be increased by adjusting the dimensions and relative positions of the TFT routing traces and the touch routing traces as well as the rearrangement of in-pixel contacts. The adjustments may improve the amount of on-axis optical transmission through the active area 100 without compromising display performance. For example, the adjustments may result in a percentage (e.g., 35%) increase in "open ratio." The transmission of the open areas 108 may be related to the layers included in the open areas 108. The open areas 108 may include multiple layers, as will be appreciated by those skilled in the art. For instance, the open areas 108 may include on-cell touch (inorganic and organic layers), Thin-Film Encapsulation, Organic planarization & Pixel Defining Layer, Inorganic barrier/buffer/gate & interlayer dielectrics, and Polyimide substrate. The transmission of the open areas 108 may be impacted by the properties of the layers, such as the layer compositions, the layer thicknesses, optical absorption of the layers, interfacial reflections, optical interferences among the layers, etc. In addition, various display signals may obfuscate the ambient light signal, as illustrated in FIG. 8.

Figure 8:
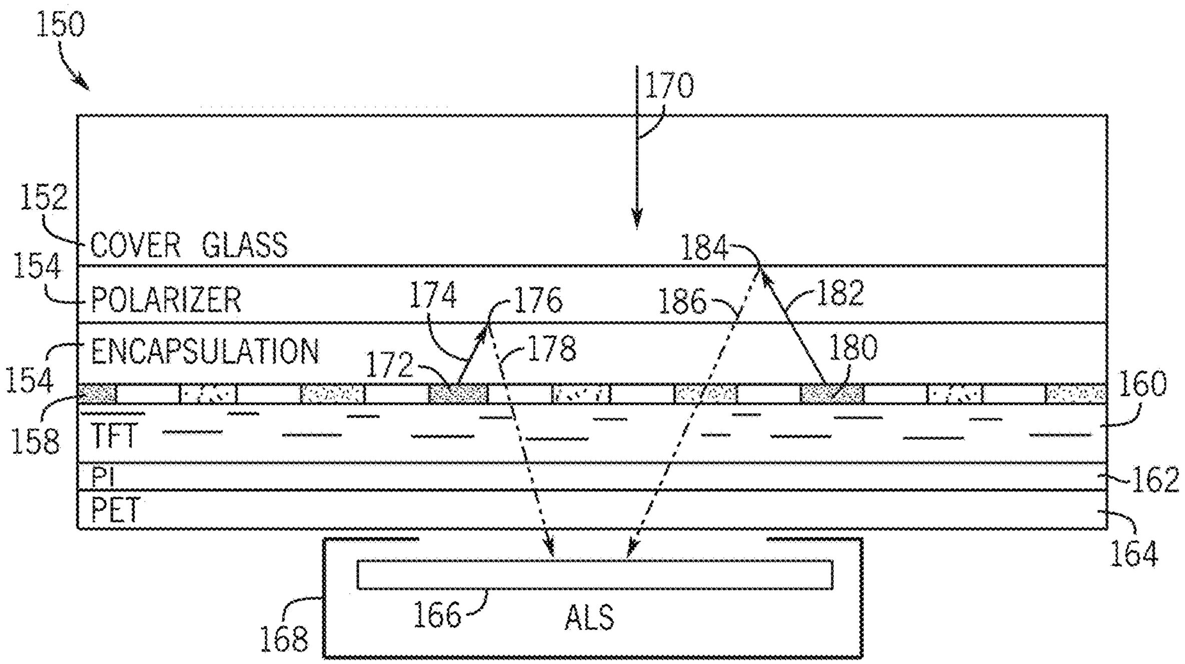
FIG. 8 is a block diagram showing a cross section of a portion of the active area in FIG. 7, according to embodiments of the present disclosure.

FIG. 8 is a block diagram showing a cross section of a portion 150 of the active area 100. In FIG. 8, the portion 150 of the active area 100 may include multiple layers, such as a cover glass layer 152, a polarizer layer 154, an encapsulation layer 156, and an OLED layer 158, which may include multiple OLEDs (e.g., a Red OLED, a Green OLED, a Blue OLED, or a white OLED). The portion 150 may also include a TFT routing layer 160, a Polyimide layer 162, and a Polyethylene Terephthalate (PET) layer 164. An ambient light sensor (ALS) 166 may be placed under the portion 150 of the active area 100 of the display in an ALS housing 168. An ambient light signal 170 may be transmitted through the multiple layers of the portion 150, and the transmitted signal of the ambient light signal 170 may be received by the ALS 166. In addition, the front-emitted light of the OLEDs in the OLED layer 158 may be reflected back to the display from interfaces between two layers of the multiple layers of the active area 100. The reflections of front-emitted light of the OLEDs from the interfaces between two layers of the multiple layers of the active area 100 and light emissions generated by other mechanisms beyond simple reflections (e.g., emissions from outside of the OLED cavities) may contribute to a back-emission directed towards the back of the display. For example, an OLED 172 may emit a front-emitted light signal 174, which may be reflected by an interface 176 between the encapsulation layer 156 and the polarizer layer 154. The reflected light signal 178 may transmit back to the display and be received by the ALS 166. In another example, an OLED 180 may emit a front-emitted light signal 182, which may be reflected by an interface 184 between the polarizer layer 154 and the cover glass layer 152. The reflected light signal 186 may transmit back to the display and be received by the ALS 166. Accordingly, the ALS 166 may receive the transmitted signal of the ambient light signal 170 and signals from the back-emission. As illustrated in FIG. 8, multiple paths may be possible for the back-emission light to reach the ALS 166. In addition, reflection signals and scattering signals may interfere with the ambient light signal to be sensed by the ALS 166. That is, other signals of the display device may crosstalk with the ambient signal, resulting in an erroneous or inaccurate sensor reading. As such, the ambient light sensor may not accurately adjust the brightness for the display.

Figure 9:
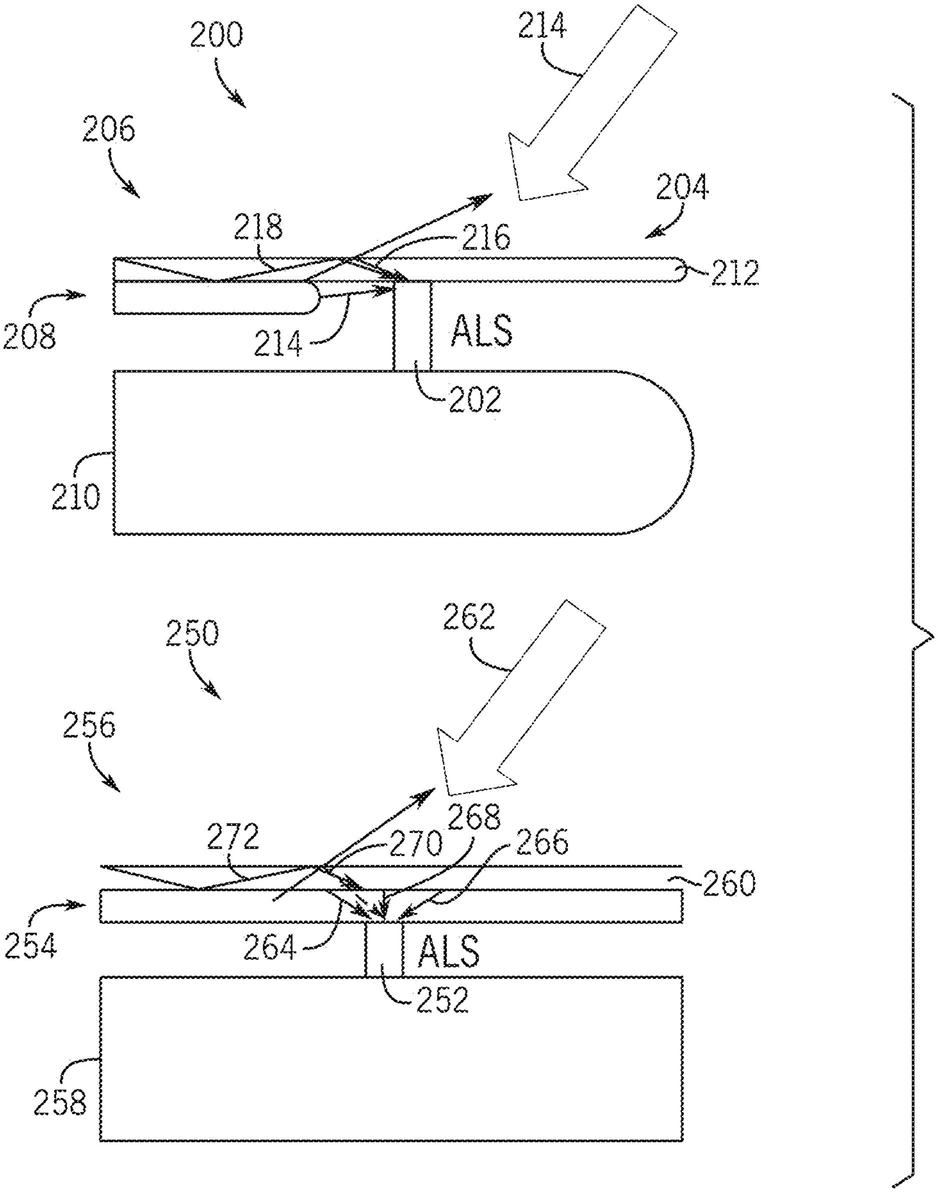
FIG. 9 is a block diagram illustrating multiple light signals received at ambient light sensors, according to embodiments of the present disclosure.

FIG. 9 illustrates multiple light signals received at a respective ambient light sensor located at different locations relative to an open area of an active area of the display. In FIG. 9, a diagram 200 shows an ALS 202 located in an open area 204 of the active area 206 of the display. As mentioned above, the open area 204 may include areas free from light-attenuating routing traces (e.g., TFT routings, touch routings) and OLED anodes. A light-attenuating layer 208 may include the light-attenuating routing traces (e.g., TFT routings, touch routings) and OLED anodes. As illustrated in the diagram 200, the ALS 202 is located between an ALS housing 210 and a layer 212 of the active area 206. As mentioned above, the open area 204 may include multiple layers, and the layer 212 is used as a simplified layer for the multiple layers in the open area 204. As illustrated in the diagram 200, an ambient light signal 214 may transmit through the layer 212 in the open area 204, and the transmitted light signal may be received by the ALS 202. In addition, a direct emission signal 214 from the light-attenuating layer 208 (e.g., from OLEDs in the light-attenuating layer 208), a reflection signal 216 reflected by the layer 212, and a scattering signal 218 transmitted in the layer 212 may be received by the ALS 202.

In FIG. 9, a diagram 250 shows an ALS 252 located behind a light-attenuating layer 254 of an active area 256 of the display. As mentioned above, the light-attenuating layer 254 may include light-attenuating routing traces (e.g., TFT routings, touch routings) and OLED anodes. As illustrated in the diagram 250, the ALS 252 is located between an ALS housing 258 and the light-attenuating layer 254 of the active area 256. A layer 260 is used as a simplified layer for multiple layers in an open area (not shown in the diagram 250) of the active area 256. As illustrated in the diagram 250, an ambient light signal 262 may transmit through the layer 260 and the light-attenuating layer 254, and the transmitted light signal may be received by the ALS 252. In addition, emission signals 264, 266, and 268 from different locations of the light-attenuating layer 254, a reflection signal 270 reflected by the layer 260, and a scattering signal 272 transmitted in the layer 260 may be received by the ALS 252. A back-emission signal may include the signals 264, 266, 268, 270, and 272. The intensity of the ambient light 262 transmitted through the light-attenuating layer 254 may be reduced substantially (e.g., absorbed by the light-attenuating layer 254). Accordingly, an ALS 252 located behind the light-attenuating layer 254 may receive substantially less ambient light than an ALS located outside of the light-attenuating layer 254.

As shown in FIG. 9, an ALS 252 located behind the light-attenuating layers of the display may receive less ambient light and much more light signals other than the ambient light (e.g., back-emission signals), which may cause more optical crosstalk with the ambient light. Accordingly, there may be at least two ways to improve the performance of the ALS 252 located behind the light-attenuating layers. One way is to increase the ambient light received by the ALS 252 located behind the light-attenuating layers of the display, and the other way is to reduce the effective optical crosstalk. The "open-ratio" of the display may be increased to increase the ambient light received by the ALS located behind the light-attenuating layers of the display. As mentioned above, the "open-ratio" of an active area of the display may be increased by adjusting the dimensions and relative positions of the TFT routing traces and the touch routing traces as well as the rearrangement of in-pixel contacts. In addition, the ALS may be designed to improve (e.g., maximize) sensitivity and reduce (e.g., minimize) the impact of display back-emission.

Figure 10:
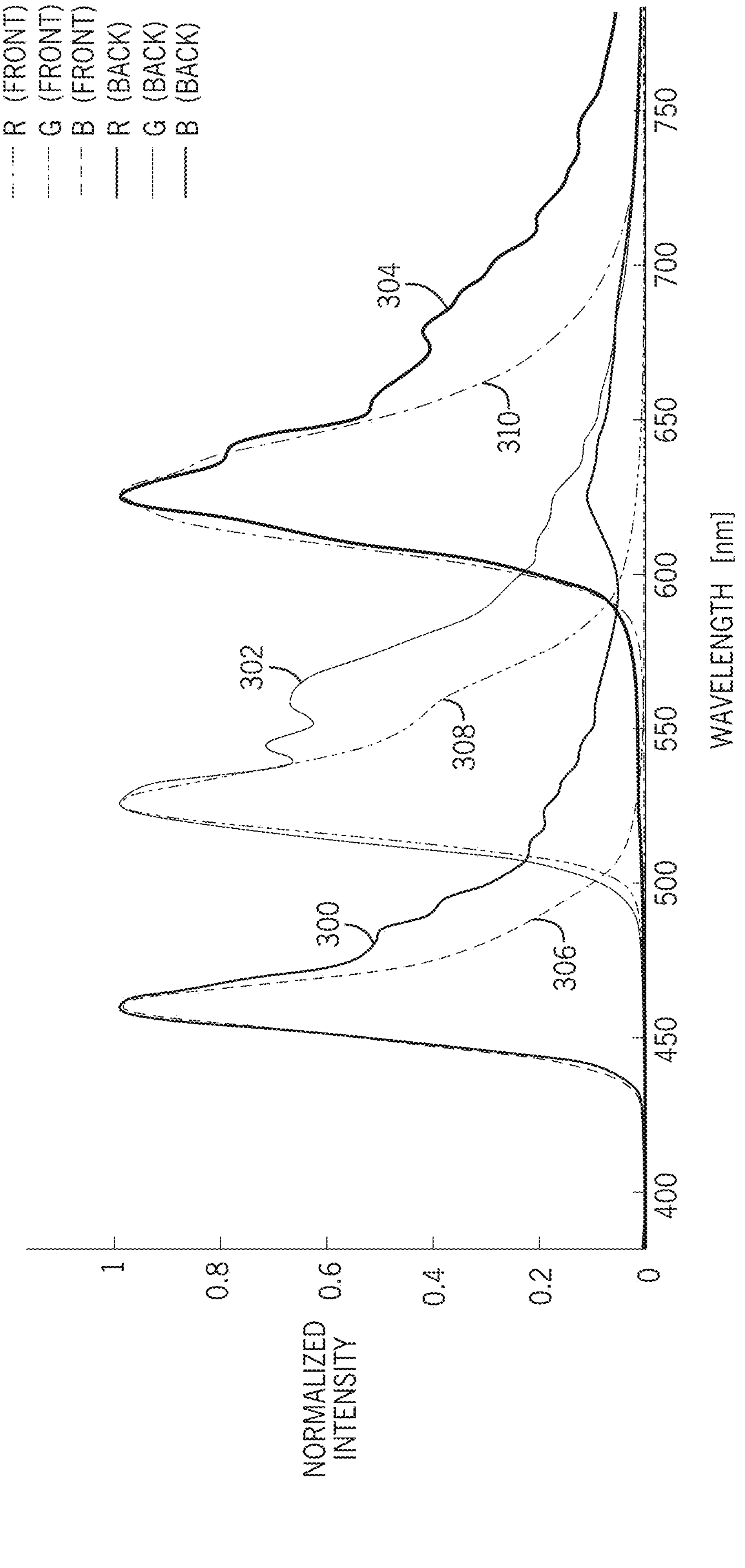
FIG. 10 is a graph showing back emission spectra, according to embodiments of the present disclosure.

FIG. 10 is a graph of spectra with normalized intensity for front-emissions and back-emissions of the display. In, FIG. 10, a curve 300 shows a spectrum of the back-emission of the blue OLEDs of the display, a curve 302 shows a spectrum of the back-emission of the green OLEDs of the display, and a curve 304 shows a spectrum of the back-emission of the red OLEDs of the display. In FIG. 10, a curve 306 shows a spectrum of the front-emission of the blue OLEDs of the display, a curve 308 shows a spectrum of the front-emission of the green OLEDs of the display, and a curve 310 shows a spectrum of the front-emission of the red OLEDs of the display. As illustrated in FIG. 10, a back-emission spectrum may have a similar shape to the respective front emission spectrum of the same color OLEDs with additional broadening of the respective emission peak. The broadening may be indicative of multiple back-emission mechanisms beyond simple reflections (e.g., emission originating outside of the OLED cavities). The back-emission received by an ALS may be related to both the display luminance set-point and the image content that is displayed in the region near the ALS. The display back-emission may contribute a significant error when compared to the ambient light signals. The ALS may be designed to increase (e.g., maximize) sensitivity and reduce (e.g., minimize) the impact of display back-emission, such as using channels with optimization criteria to reduce (e.g., minimize) the response of the ALS to the light emission of the display, as illustrated in FIG. 11.

Figure 11:
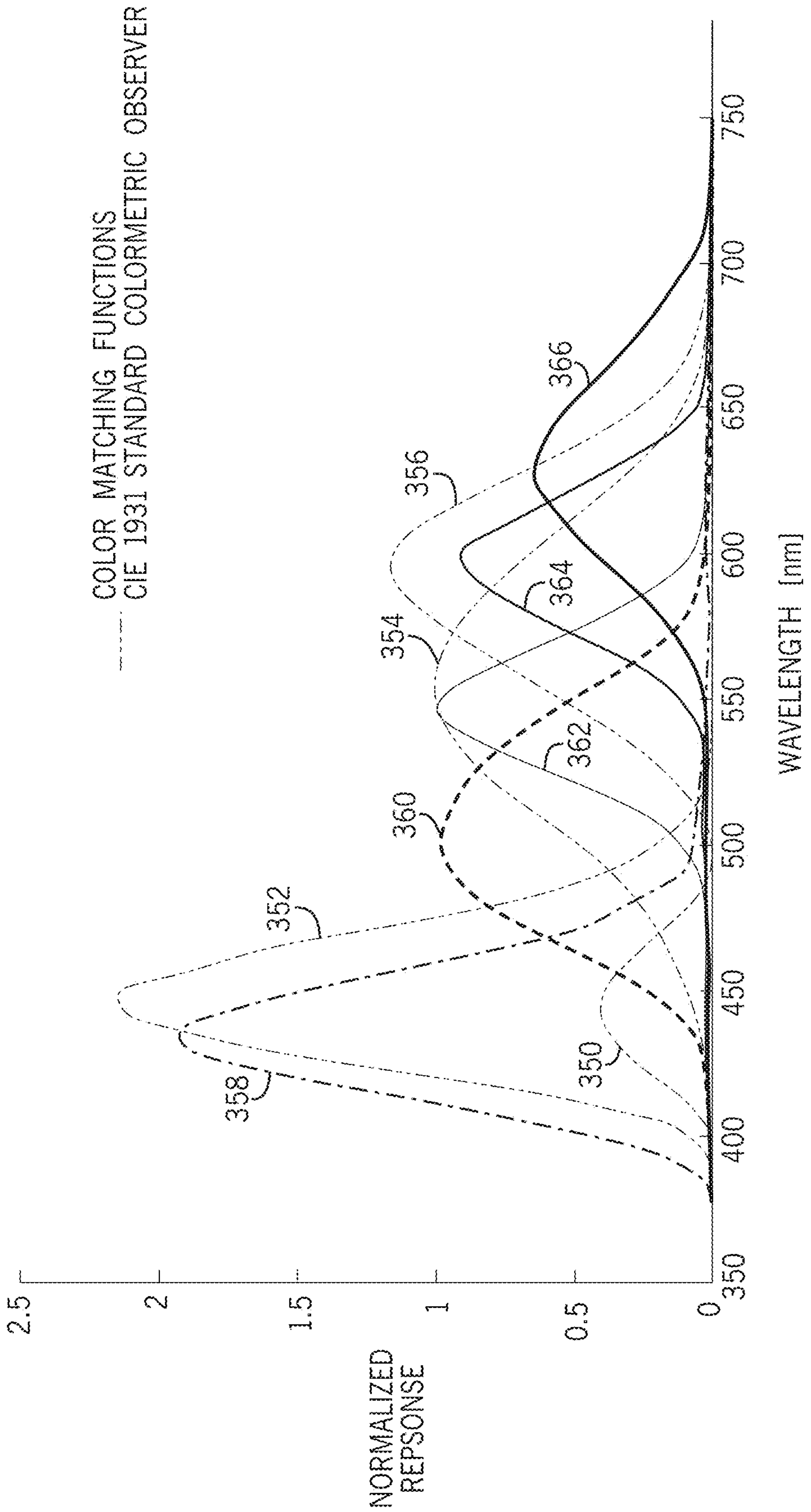
FIG. 11 is a graph showing spectral response of an ambient light sensor, according to embodiments of the present disclosure.

FIG. 11 is a graph showing normalized spectral response of an ALS. Human color vision may be described by color matching curves 350, 352, 354, and 356 in FIG. 11 (e.g., CIE 1931 standard colorimetric observer). Since displays are designed to present color information to the human eye, it may be desirable to have peaks of the display emissions (e.g., curves 306, 308, 310 in FIG. 10) overlapped with the color matching curves. In some embodiments, the ALS module may use a five-channel sensor to collect light from the ambient environment in five different wavelength ranges. In FIG. 11, five curves 358, 360, 362, 364, and 366 are corresponding to normalized responses of the ALS in the five corresponding wavelength ranges, which corresponds to the five channels of the ALS. The peak positions and spectral shapes of the channels may be selected to recover color tristimulus values from the ambient light and accurately report color. In addition, additional criteria may be used to reduce (e.g., minimize) the response of the ALS to the light emissions of the display. For instance, the peak positions and spectral shapes of the channels may be selected to reduce the response of the ALS to the light emissions of the display according to the spectra of the display emissions. For example, the peak positions and spectral shapes of the channels may be selected so that at least a portion of the display emissions (e.g., the peaks of the display emissions) may be excluded from the peak positions of the channels. The readings from the five-channels may be converted to color tristimulus values (e.g., values measuring light intensity based on the three primary color values (red, green, blue) and/or represented by X, Y, and Z coordinates in a 3-D space) through a matrix conversion. In addition, the ALS module sensitivity may be improved by increasing package optical efficiency and sensor photodiode size. As illustrated in FIG. 11, the ALS may include multiple channels for sensing the light from the ambient environment. Although five channels are illustrated in the embodiment in FIG. 11, the ALS described herein may sense light from the ambient environment over any number of channels for any number of wavelength ranges (e.g., one wavelength range, two wavelength ranges, and so forth).

Figure 12:
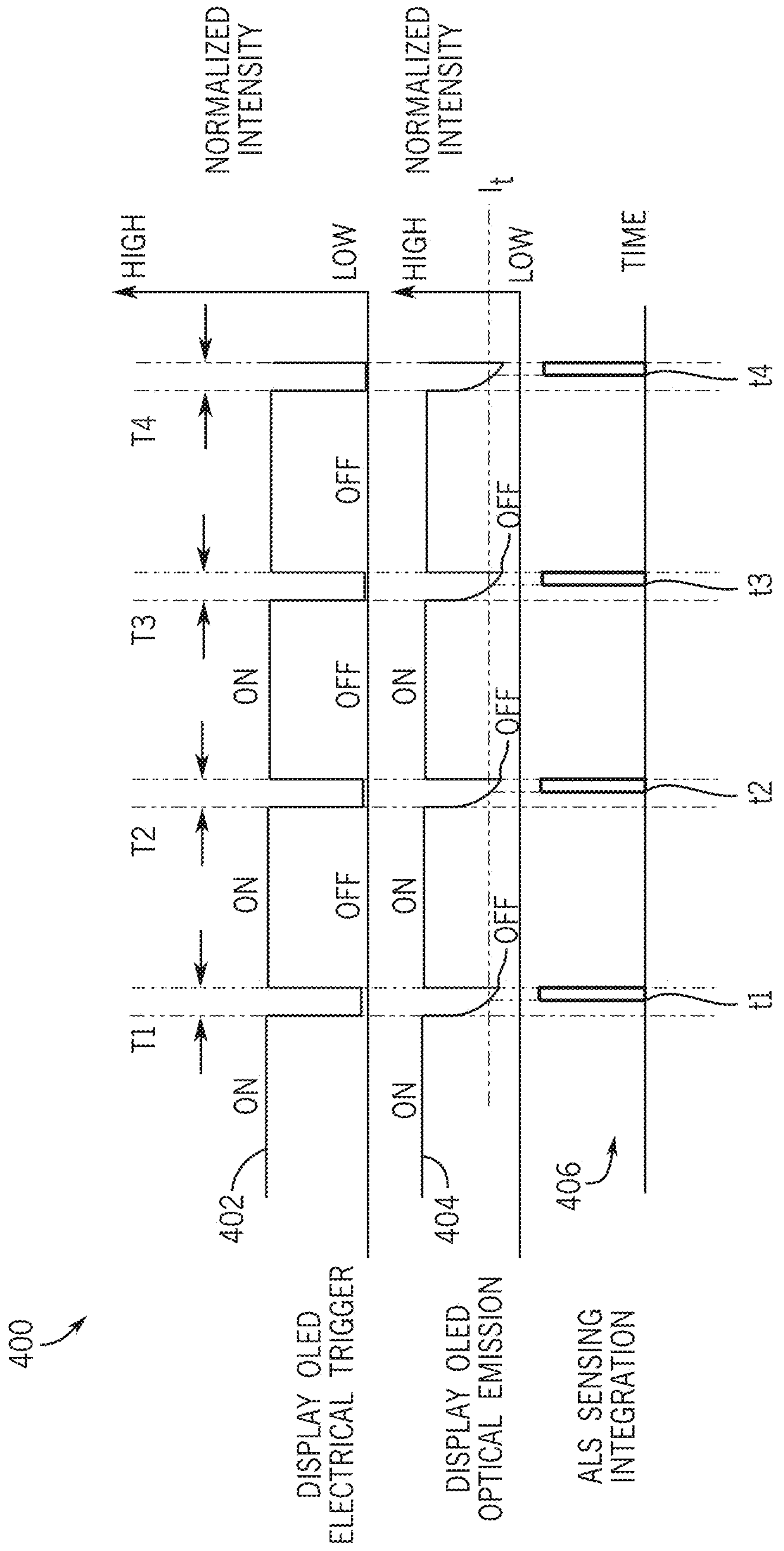
FIG. 12 is a timing diagram of an ambient light sensor sensing integration, according to embodiments of the present disclosure.
Figure 13:
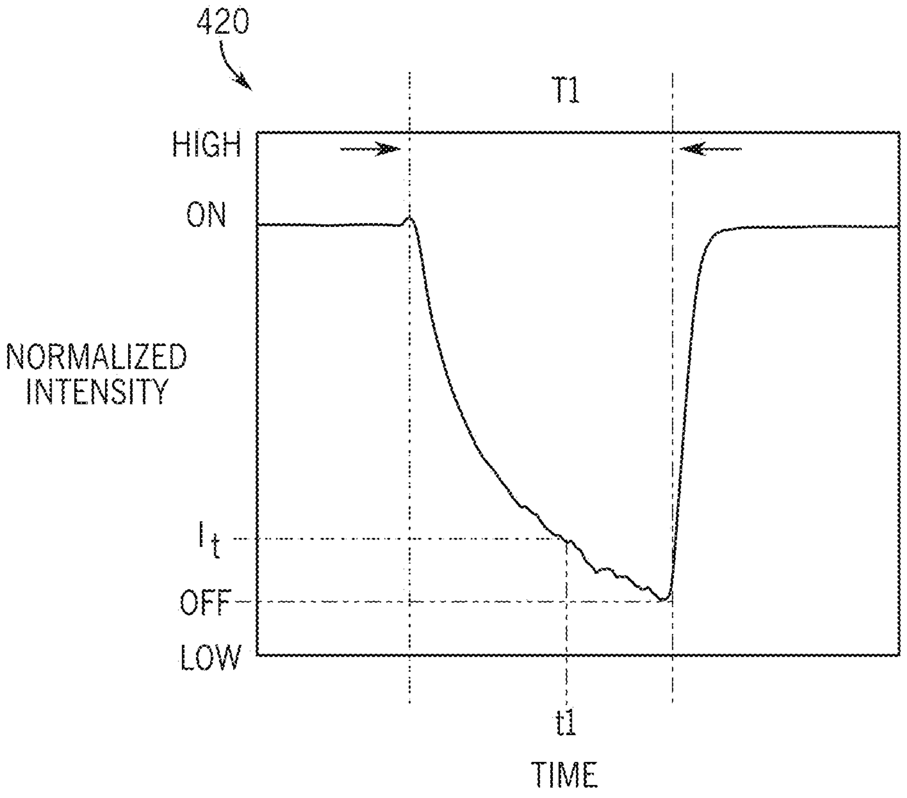
FIG. 13 is a timing diagram showing display emission transient behavior, according to embodiments of the present disclosure.

To reduce (e.g., minimize) the back emission induced crosstalk, the ALS may be designed to be capable of fast sensing within short time period windows (e.g., less than an emission blanking period of a display pixel). With the ALS capable of fast sensing (e.g., less than an emission blanking period of a display pixel), the ALS may be synchronized to the OLED emission blanking period, as shown in FIG. 12. FIG. 12 illustrates a timing diagram 400 of an embodiment implementing ALS sensing during emission blanking periods. In FIG. 12, a display OLED electrical trigger signal 402 may be used to control (e.g., turn on/turn off) optical emission 404 of a display OLED. The ALS sensing integration 406 may be synchronized to the display OLED emission blanking periods, such as blanking periods T1, T2, T3 and T4 illustrated in FIG. 12. Thus, the ALS sensing integration occurs during the blanking periods, such as during the T1, T2, T3, and T4 periods. During the blanking periods (e.g., T1, T2, T3, T4), the display OLED electrical trigger signal 402 is turned off, which may turn off the power supply to the display OLED. The display OLED optical emission may have an intrinsic emission-off transient behavior and may decay for a period of time before being completely off, as shown in FIG. 13. Thus, during the blanking periods, the display OLED optical emission is not completely off. To reduce the effect of the display emission crosstalk, the ALS sensing integration 406 may start sensing integration at a certain time after the blanking periods start when the display OLED optical emission 404 is not more than a threshold value $I_t$. For example, during the blanking periods T1 T2, T3, and T4, the ALS sensing integration may start at corresponding time t1, t2, t3, and t4, respectively, when the display OLED optical emission 404 is not more than the threshold value $I_t$. The ALS sensing integration may end any time before or at corresponding end of each blanking period (e.g., T1, T2, T3, and T4).

FIG. 13 shows a portion 420 of the display OLED optical emission 404, which illustrates the blanking period T1 and the corresponding start time t1 for the ALS sensing integration during the blanking period T1. As shown in FIG. 13, the ALS sensing integration may start at any time after time t1 or at time t1, when the display OLED optical emission 404 is not more than the threshold value $I_t$. The ALS sensing integration may end any time before or at the end of the blanking period T1.

Figure 14:
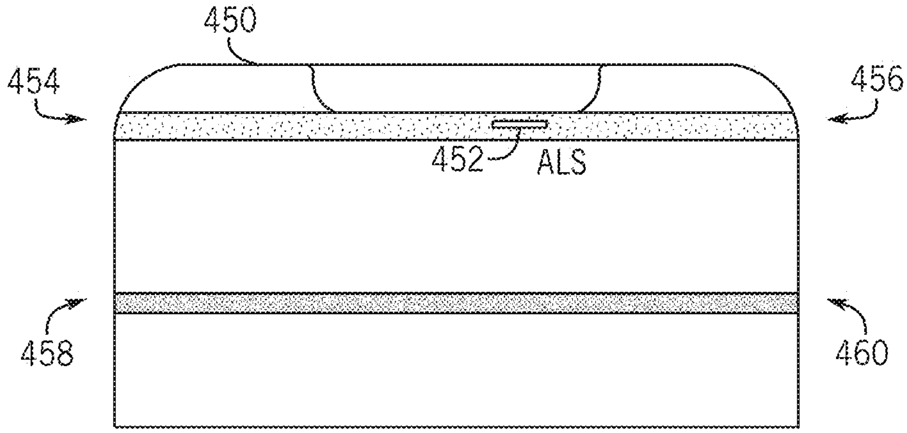
FIG. 14 is a block diagram showing an emission mask of an ambient light sensor, according to embodiments of the present disclosure.

Implementing ALS sensing integration during the blanking periods of the OLED display emission may reduce the amount of display back-emission observed by the ALS substantially (e.g., seven to ten times reduction) and thus reduce the display crosstalk. In addition, the fast sensing integration may accommodate the rapidly changing, dynamic image content displayed on the display. Additionally or alternatively to the ALS sensing during emission blanking periods, a per-frame content-based crosstalk estimation scheme may be used to compensate for the display crosstalk. For instance, the OLED transient behavior, as illustrated in FIG. 13, may impact the amount of crosstalk that the ALS receives during integration time, thus is an important input to the crosstalk estimation. Additionally, OLED displays may be driven line by line. Accordingly, different pixel lines may have different average back-emission amplitude during the ALS integration period. As such, the ALS sensor may sense a gray band “emission mask” representing the average amount of time that light emission of a particular line of pixels is on during the ALS integration period, as illustrated in FIG. 14. Thus, the gray levels in the gray bank of the emission mask may correspond to average amount of time that light emission of a particular line of pixels is on during the ALS integration period. For example, the minimum gray level of the gray bank emission mask may correspond to the minimum average amount of time that light emission of a particular line of pixels is on during the ALS integration period, and the maximum gray level of the gray bank emission mask may correspond to the maximum average amount of time that light emission of a particular line of pixels is on during the ALS integration period.

FIG. 14 is a schematic diagram illustrating emission masks on a portion 450 of a display. An ALS 452 may be located beneath a display pixel line 454 on the portion 450 of the display, and the ALS 452 integration period may be synchronized to blank periods of the display pixel line 454. That is, the ALS 452 integration may occur during the blanking periods of the display pixel line 454. Accordingly, the display pixel line 454 may have a lower gray level value on a corresponding emission mask 456 because less light emission is generated from the display pixel line 454 during the blanking periods of the pixel line 454. As mentioned above, due to the intrinsic emission-off transient behavior of the OLED, the emission of the display pixel line 454 may decay for a period of time during the blanking periods, which may result a nonzero value in the corresponding gray band emission mask 456. The shape and width of the emission mask 456 may depend on the OLED transient behavior, the brightness of the display, and the emission-off duty cycle. For example, the emission mask 456 may be generally narrowest when the display is brightest and the duty cycle is highest. On the portion 450 of the display, another display pixel line 458 may have a minimum gray level value on a corresponding gray band of an emission mask 460 for an ALS located beneath the display pixel line 458.

Figure 15:
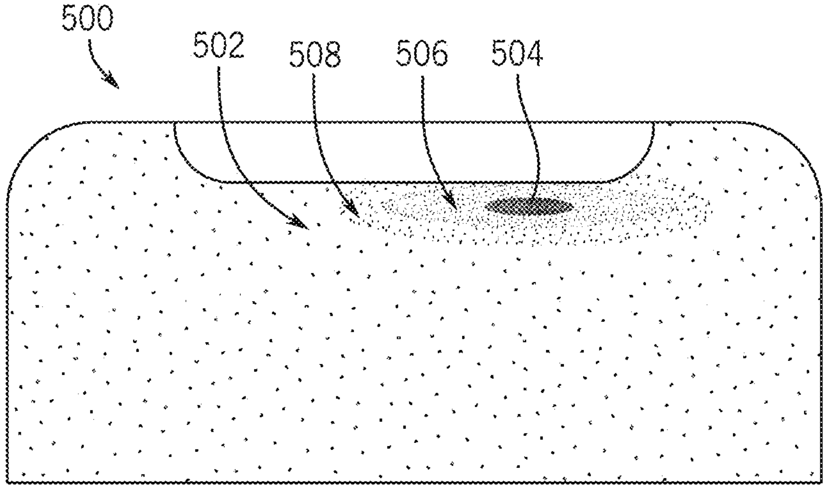
FIG. 15 is a block diagram showing a display crosstalk heat map, according to embodiments of the present disclosure.

In addition, the amount of display back-emission observed by the ALS is related to the brightness of the display pixels in the vicinity of the ALS and the optical coupling of the display pixels in the vicinity of the ALS to the ALS. A display crosstalk "heat map" may be used to describe the optical coupling of each display pixel to the ALS, as illustrated in FIG. 15. FIG. 15 shows a portion 500 of the display with a heat map 502 for an ALS located at a location 504 on the portion 500 of the display. The heat map may be coded so that different gray values in the heat map may represent different optical couplings. For example, a first gray value 506 may be used for optical couplings with a first value (e.g., from display pixels located within a first threshold distance to the ALS location 504), and a second gray value 508 may be used for optical couplings with a second value (e.g., from display pixels located within a second threshold distance to the ALS location 504). A respective crosstalk potential from each display pixel to the ALS located at the location 504 may be determined by multiplying the crosstalk heat map and the emission mask of the ALS (e.g., the emission masks illustrated in FIG. 14). The respective crosstalk potential may be multiplied by the display content on a per-frame basis, and the result may be summed over all display pixels in a vicinity of the ALS to obtain an estimated optical crosstalk over the vicinity of the ALS. The process may be repeated for each display primary emissions (e.g., red, green, blue, as illustrated in FIG. 10) and for each of the ALS response channels (e.g., five response channels, as illustrated in FIG. 11) to obtain a total estimated optical crosstalk. The total estimated optical crosstalk may be subtracted from the sensing measurement of the ALS. The calculation of the total estimated optical crosstalk may be done in real-time as part of the display image processing flow. The content-based crosstalk estimation and compensation may achieve high sensing efficiency for the ALS and reduce the impact of display crosstalk substantially (e.g., by a factor of ten). To ensure privacy of the display content, the calculation of the display content-based crosstalk may be isolated within the hardware of the secure display pipeline inside the processor core complex 18. The estimate of the display content-based crosstalk may be aggregated on-the-fly by combining the content in a non-separable manner with the emission mask and the heat map. Only the final total estimated optical crosstalk may be available for adjustments of the ALS sensor reading, and no memory of the display content may be maintained.

Figure 16:
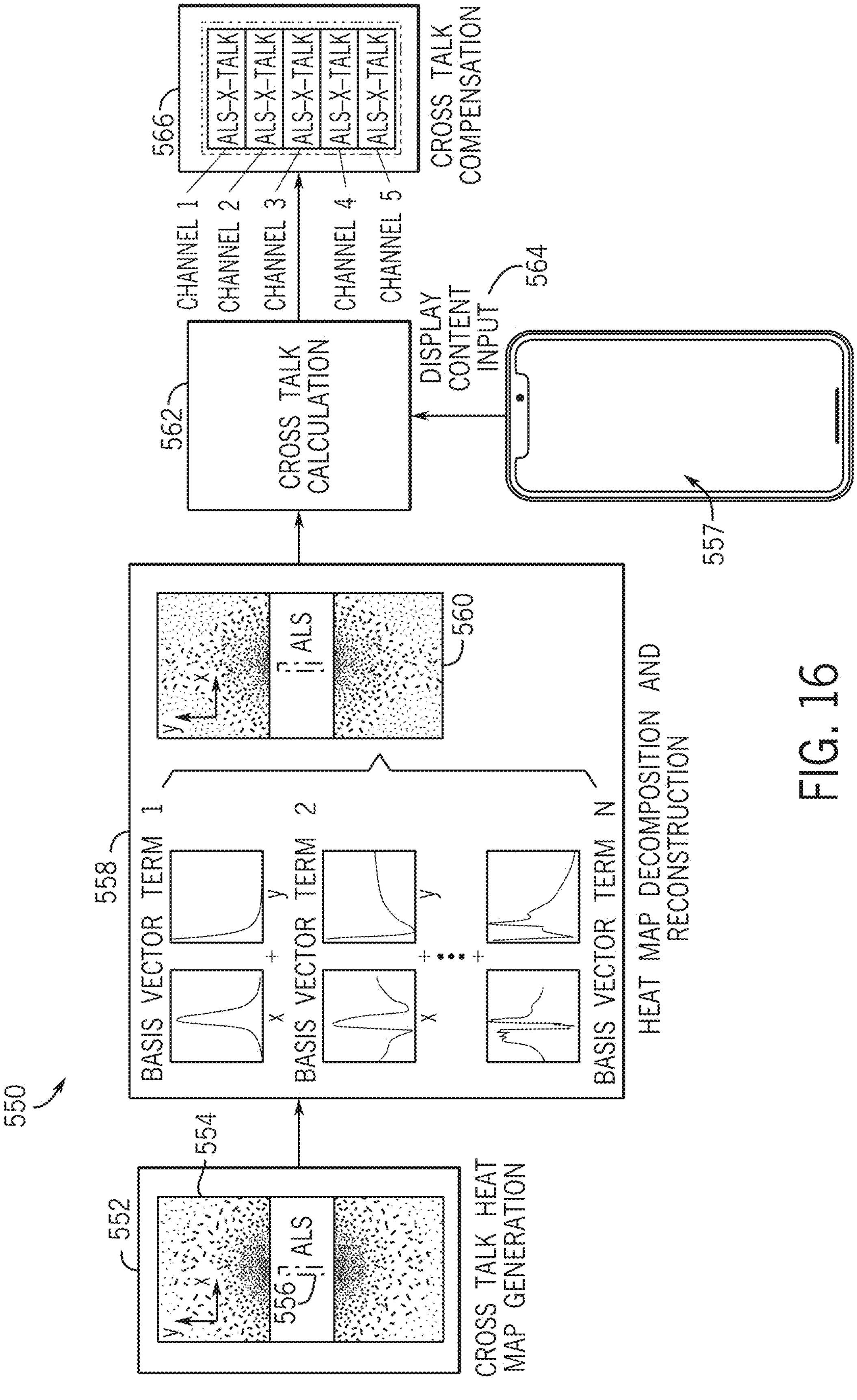
FIG. 16 is a flow diagram illustrating a process of crosstalk calculation, according to embodiments of the present disclosure.

FIG. 16 depicts a flow diagram of a process 550 for calculating display content-based crosstalk compensation described above. As shown, at block 552, a crosstalk heat map 554 may be generated for an ALS 556 on a display 557. As mentioned above, the heat map 554 may describe the optical coupling of each display pixel in a vicinity of the ALS 556 to the ALS 556. The heat map data may be quickly acquired by utilizing compressive sensing using reduced (e.g., minimize) measurements with sufficient signal to noise ratio (SNR). For example, sensing the signals and generating the heat map may involve a raster scan pattern using adaptive kernels and scanning step sizes, random binary masks, and/or a 2D basis function that sparsely represent the expected crosstalk heat map.

Figure 20A:
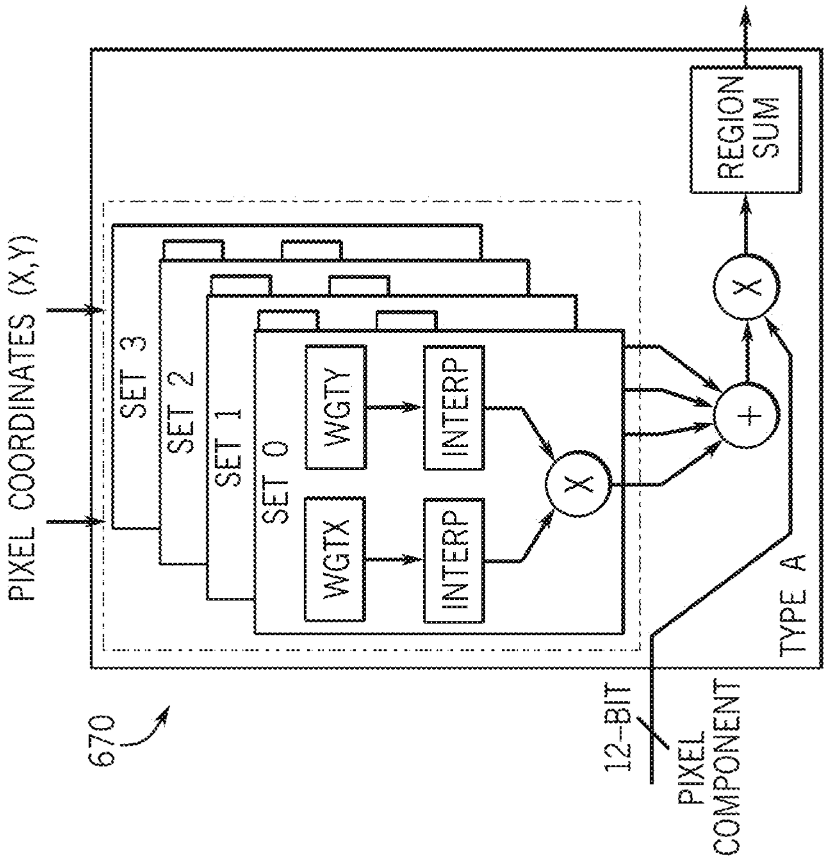
FIG. 20A is a block diagram showing a core unit implemented in the Ambient Light Color Sensing (ACS) statistics process in FIG. 19, according to embodiments of the present disclosure.
Figure 20B:
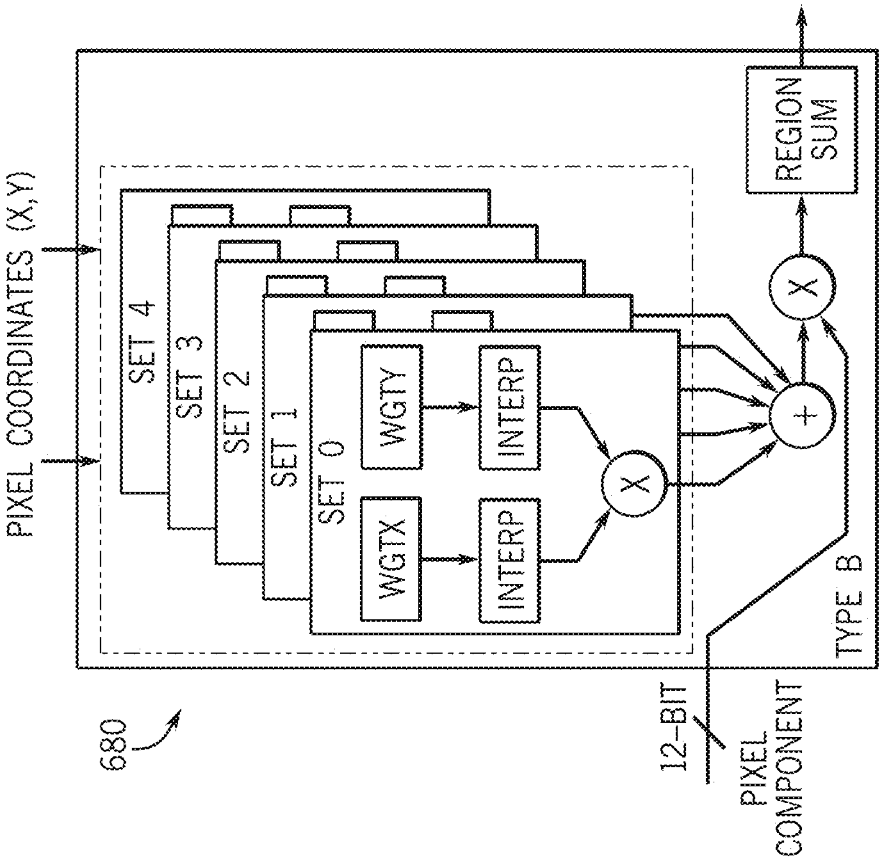
FIG. 20B is a block diagram showing another core unit implemented in the Ambient Light Color Sensing (ACS) statistics process in FIG. 19, according to embodiments of the present disclosure.

At block 558, after the heat map 554 is generated, the heat map 554 may be decomposed into a set of orthogonal SVD (Singular Value Decomposition) basis vector terms (e.g., basis vector term 1, basis vector term 2 . . . basis vector term N) in a two dimensional spatial space (e.g., X-Y plane illustrated in heat map 554) to reduce computation complexity of heat map storage and processing for the processor core complex 18. In some embodiments, the two-dimensional SVD distributions in a basis vector term may be perfectly separable, e.g., an X component of a basis vector term may be independent of an Y component of the basis vector and thus the basis vector term may be a sum of the X component and the Y component, as illustrated in the basis vector terms in block 558. In some embodiments, the two-dimensional SVD distributions in a basis vector term may not be perfectly separable, and thus the basis vector term may include a product of the X component and the Y component, as illustrated in FIG. 20A and FIG. 20B. The decomposed heat map 554 may be calibrated by using an emission mask of the ALS 556 to generate a calibrated heat map 560. As mentioned above, a respective crosstalk potential from each display pixel to the ALS 556 may be determined by multiplying the crosstalk heat map and the emission mask of the ALS 556. Thus, the calibrated heat map 560 may include a set of weighted SVD basis vectors representing crosstalk potentials from each display pixel to the ALS 556, and the weights for the SVD basis vectors may be determined based on the emission mask of the ALS 556.

At block 562, display content 564 may be input from the display 557 and used with the calibrated heat map 560 to calculate an estimated optical crosstalk for the ALS 556, which may be referred as a reconstruction of the SVD basis vectors. For instance, the respective crosstalk potential of each display pixel in the calibrated heat map 560, which may be represented by the weighted SVD basis vectors, may be multiplied by the display content 564 (e.g., on a per-frame basis), and the result may be summed over all display pixels in the vicinity of the ALS 556 to obtain an estimated optical crosstalk over the vicinity of the ALS 556, as described above in the paragraphs related to FIG. 15.

Figure 17:
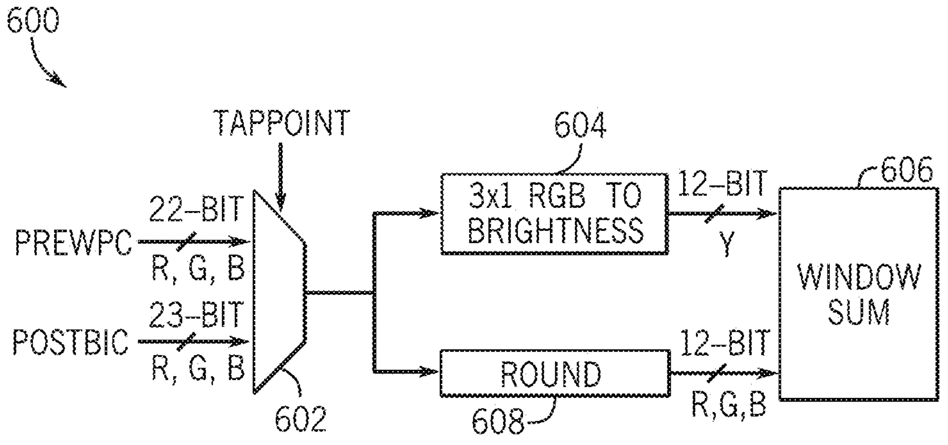
FIG. 17 is a block diagram illustrating an Ambient Light Luminance Sensing (ALLS) statistics process, according to embodiments of the present disclosure.
Figure 18:
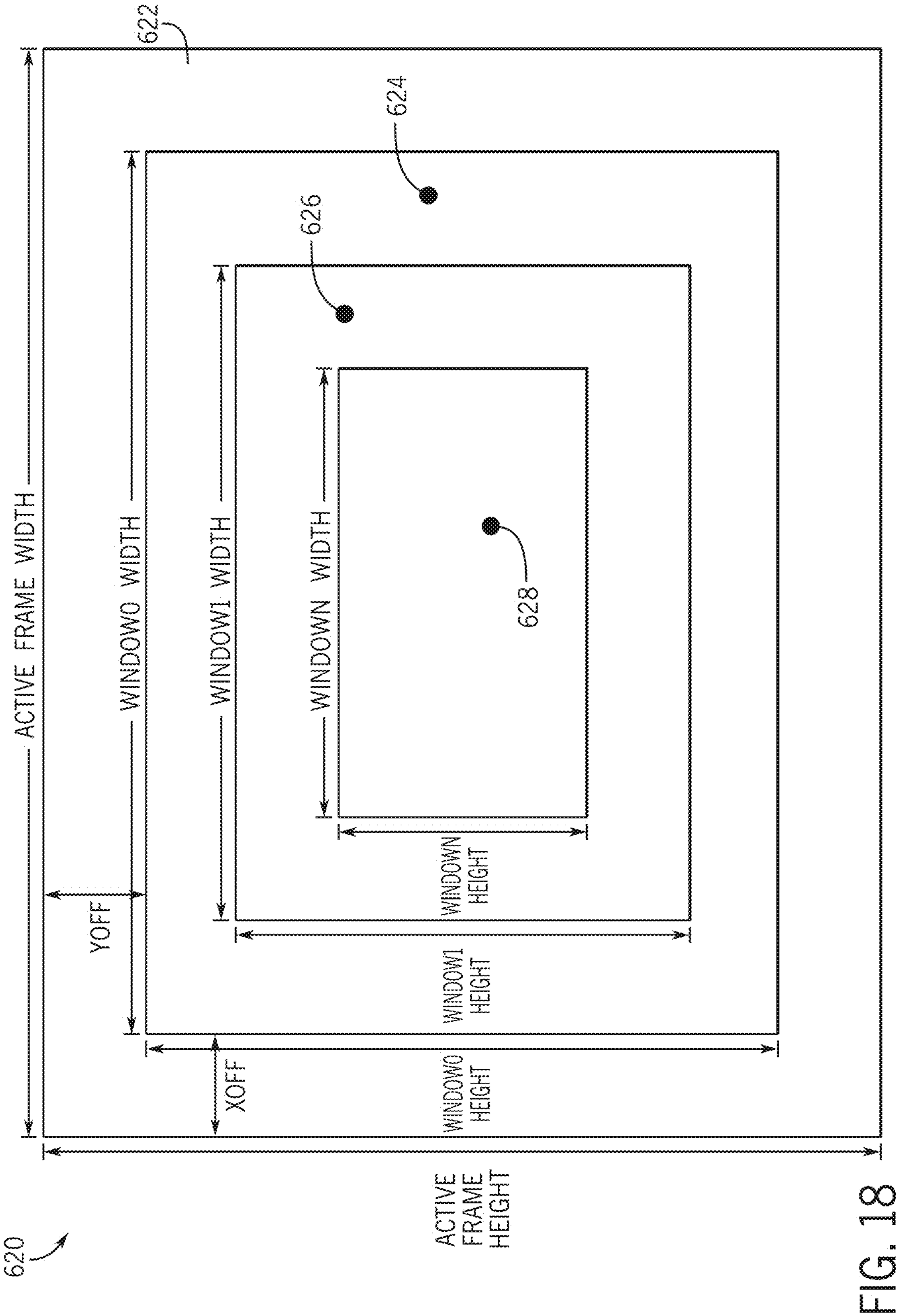
FIG. 18 is a block diagram illustrating an example of an arrangement of configurable windows, according to embodiments of the present disclosure.
Figure 19:
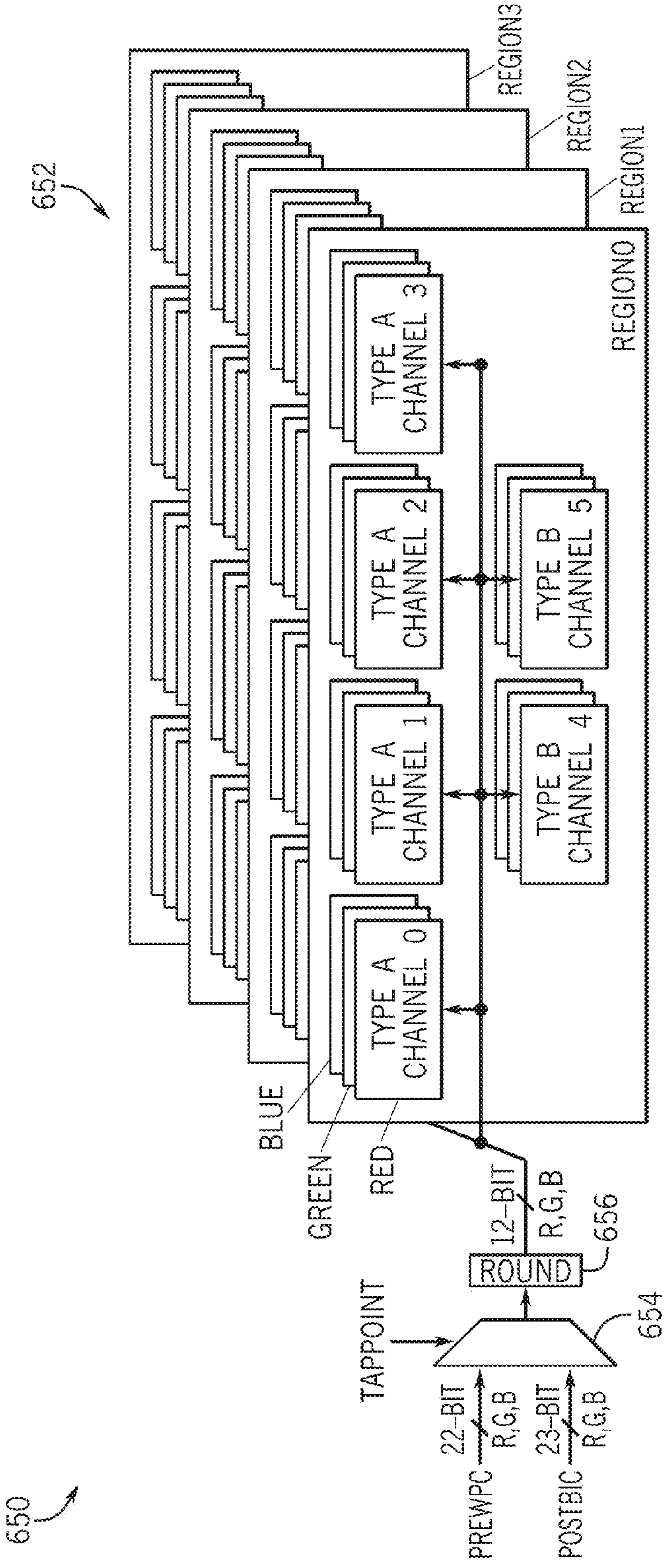
FIG. 19 is a block diagram illustrating an Ambient Light Color Sensing (ACS) statistics process, according to embodiments of the present disclosure.

In some embodiments, ambient light luminance sensor measurements may need to be compensated for displayed pixel values in the display content 564. An Ambient Light Luminance Sensing (ALLS) statistics process may be used to calculate the accumulated color and brightness data of the display content 564, which may be used in block 562 to calculate the compensation for the ambient light luminance sensor measurements that may be used at block 566, as illustrated in FIGS. 17-18. Alternatively or additionally, ambient light color sensor measurements may need to be compensated for displayed pixel color components (e.g., red, green, blue) in the display content 564. Thus, the crosstalk calculation process may be repeated for each primary color component (e.g., red, green, blue) of the display pixels in the display content 564 for each of the ALS spectral response channels (e.g., five response channels, as illustrated in FIG. 11) to obtain a total estimated optical crosstalk for each of the ALS spectral response channels, which may be used at block 566 as the crosstalk compensation for adjustments of the sensor reading of the five spectral response channels of the ALS 556. An Ambient Light Color Sensing (ACS) statistics process likewise may be used to calculate the compensation for the ambient light color sensor measurements, as illustrated in FIGS. 19-20.

In addition, during the generation of the reconstruction of the SVD basis vectors in block 562, regularizations may be used to reduce the effect of noise on the reconstruction. By way of example, the regularizations may include truncated SVD (Singular Value Decomposition) regularization, generalized Tikhonov regularization, and/or total variation regularization.

FIG. 17 is a block diagram illustrating an Ambient Light Luminance Sensing (ALLS) statistics process 600 used to calculate the accumulated color and brightness data of display content, which may be used to calculate the compensation for ambient light luminance sensor measurements, as mentioned above. In the embodiment illustrated in FIG. 17, the ALLS statistics process 600 may be used to provide data about average color and brightness of display pixels in multiple configurable windows (e.g., 64 configurable windows) in the display content to help calculate the compensation of the sensor measurements for displayed pixel values. Color and brightness components values may be collected from the pixel values of the display content before any panel specific compensation (e.g., pre-White Point Compensation (pre-WPC) mode) or after all linear domain panel specific compensation (e.g., post-Burn-in Compensation/Burn-in statistics (post-BIC/BIS) mode), which may be selected by using a multiplexer 602. A TapPoint signal may be used as a control signal for the multiplexer 602 to select the pre-WPC mode or the post-BIC mode. The brightness values of the display pixels may be accumulated over the enabled configurable windows to obtain accumulated brightness values, as illustrated in FIG. 18.

In addition, in a converter 604, the color components (e.g., red (R), green (G), blue (B)) values may be converted to respective brightness values, which may be accumulated over the enabled configurable windows. For example, RGB components values of the display pixels may be converted to a converted brightness value Y by multiplying R, G, and B components values by a gain factor and summing the gained values in the converter 604. The converted brightness value Y is output from the converter 604 and is normalized to 12-bit before summing over the enabled configurable windows in a window sum block 606. In addition, the color components (e.g., red (R), green (G), blue (B)) values may be rounded at a unit 608 and normalized to 12-bit before inputting into the window sum block 606. The normalized brightness value Y and the rounded color component values may be summed over the enabled configurable windows in the window sum block 606 to obtain an accumulated converted brightness value and accumulated rounded color components values, as illustrated in FIG. 18. The total brightness value for a display pixel may include the accumulated brightness values of the display pixel over the enabled configurable windows and the accumulated converted brightness values of the display pixel over the enabled configurable windows. The total brightness values and the accumulated rounded color component values of the display content may be used in block 562 of FIG. 16 to calculate the compensation for ambient light luminance sensor measurements.

FIG. 18 is a block diagram illustrating an example of an arrangement 620 of configurable windows for the display content. As illustrated in FIG. 18, an active frame 622 of the display content may include several configurable windows with different dimensions, such as window 0, window 1, . . . window N (N may be any appropriate integer number determined by properties of the display). Each configurable window may have respective values (e.g., brightness values, RGB values) for each display pixel in the corresponding configurable window, and the overall values at a display pixel may be a sum of the respective values of the configurable windows that include the display pixel. For example, a display pixel 624 may be included only in the window 0, accordingly, the values of the display pixel 624 may be calculated by using the values of the display pixel 624 in the window 0. In another example, a display pixel 626 may be included in the window 0 and the window 1, accordingly, the values of the display pixel 626 may be calculated by summing the values of the display pixel 626 in the window 0 and the window 1. In another example, a display pixel 628 may be included in the window 0, the window 1 and the window 2, accordingly, the values of the display pixel 628 may be calculated by summing the values of the display pixel 628 in the window 0, the window 1 and the window 2.

FIG. 19 is block diagram illustrating an Ambient Light Color Sensing (ACS) statistics process 650 used to calculate the compensation for the ambient light color sensor measurements. In the embodiment illustrated in FIG. 19, a calculation unit 652 may be used to provide weighted color component values in multiple regions (e.g., Region0, region1, Region2, Region3) of a display and for multiple response channels (e.g., channel0, channel1, channel2, channel3, channel4, channel5) of the ambient light color sensor, which may be used as crosstalk compensations for the ambient light color sensor (e.g., as illustrated in block 566 in FIG. 16). A region on the display may be defined through four parameters in X-Y plane: X start position, Y start position, width of the region, and height of the region. In some embodiment, a SVD approach may be employed to reconstruct the weight distribution. The weight distribution may characterize the crosstalk influence of a display pixel color component to the sensor measurement. For example, for an ALS, the weight distribution may be associated with a calibrated heat map (e.g., calibrated heat map 560 in FIG. 16) of the ALS. The weight distribution may be independent per region, per color component, per channel. A 2D matrix may be used to carry information of regions and corresponding sensor channels and SVD basis vectors used for each region. For example, a certain number of sensor channels and a particular number of SVD basis vectors may be used for a given region. It should be noted that, although four regions and six channels are used in the embodiment illustrated in FIG. 19, weighted color component values may be provided for more than four regions of the display and/or for more than six response channels of the ambient light color sensor in other embodiments. For each response channel, multiple sub-units may be used for calculating corresponding weighted color components values (e.g., RED unit for red color component, GREEN unit for green color component, BLUE unit for blue color component). Color component values (e.g., R, G, B) may be collected from the pixel values of the display content before any panel specific compensation (e.g., pre-White Point Compensation (pre-WPC) mode) or after all linear domain panel specific compensation (e.g., post-Burn-in Compensation/Burn-in statistics (post-BIC/BIS) mode), which may be selected by using a multiplexer 654. A TapPoint signal may be used as a control signal for the multiplexer 654 to select the pre-WPC mode or the post-BIC mode. The color component values may be rounded at a unit 656 and normalized to 12-bit before inputting into the calculation unit 652.

The calculation unit 652 may support two types of core units, Type A as illustrated in FIG. 20A and Type B as illustrated in FIG. 20B, for calculation of weighted color component values. The Type A core unit and the Type B core unit may support different numbers of SVD basis vectors. For example, the Type A core unit may support four sets of SVD basis vectors and the Type B core unit may support five sets of SVD basis vectors, as illustrated in FIG. 20A and FIG. 20B, respectively. For instance, four channels of the ambient light color sensor may utilize the Type A core unit while two channels may utilize the Type B core unit.

FIG. 20A is a block diagram showing a Type A core unit 670. In the embodiment illustrated in FIG. 20A, the Type A core unit may support four sets of SVD basis vectors. It should be noted that in other embodiments, more or less than four sets of SVD basis vectors may be used in a Type A core unit. Each set of SVD basis vectors may include two vectors, WgtX and WgtY, representing crosstalk potential of a pixel (e.g., a pixel on the calibrated heat map 560) in a region with a pixel coordinates (X, Y). In some embodiments, the two-dimensional SVD distributions in a basis vector term, WgtX and WgtY, may not be perfectly separable, and thus the basis vector term may include a product of the WgtX and WgtY, as illustrated in FIG. 20A. The interpolation (e.g., a linear interpolation) of the vectors WgtX and WgtY may be multiplied together and summed over the four sets to obtain an overall crosstalk potential of the pixel (X, Y) to a corresponding pixel component (e.g., received from the unit 656 in FIG. 19). The overall crosstalk potential of the pixel (X, Y) may be multiplied by the pixel component, and the result may be summed over all pixels in the region (e.g., Region0, region1, Region2, Region3) to obtain the total weighted compensation of the region for the pixel component.

FIG. 20B is a block diagram showing a Type B core unit 680. For instance, the Type A core unit may support five sets of SVD basis vectors. It should be noted that in other embodiments, more or less than five sets of SVD basis vectors may be used in a Type B core unit. Each set of SVD basis vectors may include two vectors, WgtX and WgtY, representing crosstalk potential of a pixel (e.g., a pixel on the calibrated heat map 560) in a region with a pixel coordinates (X, Y). In some embodiments, the two-dimensional SVD distributions in a basis vector term, WgtX and WgtY, may not be perfectly separable, and thus the basis vector term may include a product of the WgtX and WgtY, as illustrated in FIG. 20B. The interpolation (e.g., a linear interpolation) of the vectors WgtX and WgtY may be multiplied together and summed over the five sets to obtain an overall crosstalk potential of the pixel (X,Y) to a corresponding pixel component (e.g., received from the unit 656 in FIG. 19). The overall crosstalk potential of the pixel (X, Y) may be multiplied by the pixel component, and the result may be summed over all pixels in the region (e.g., Region0, region1, Region2, Region3) to obtain the total weighted compensation of the region for the pixel component.

Figure 21:
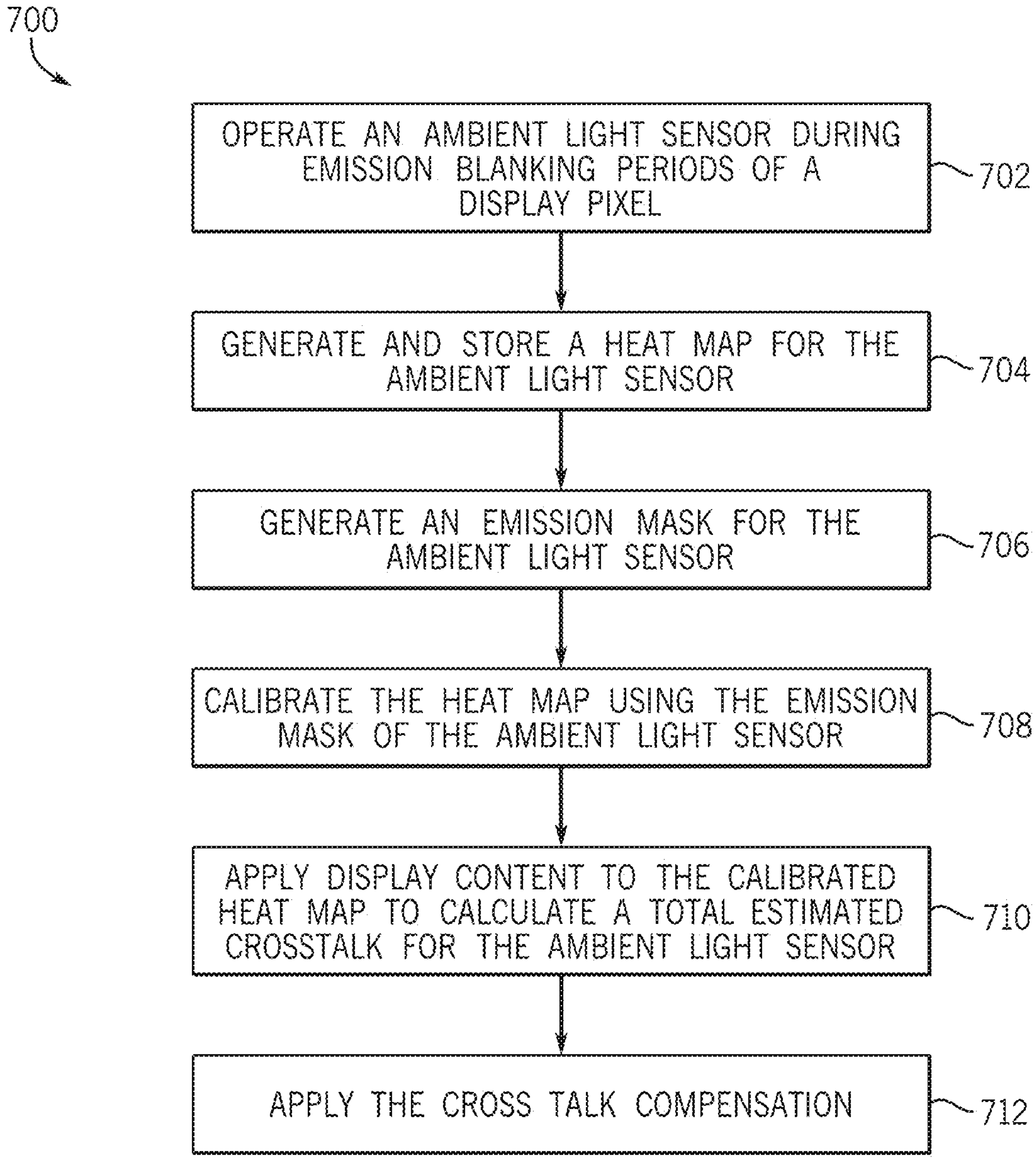
FIG. 21 is a flow diagram showing crosstalk compensation determination, according to embodiments of the present disclosure.

FIG. 21 is a flow diagram of a method 700 for implementing ALS sensing during emission blanking periods with the process 550. At block 702, an ALS of a display may be controlled (e.g., by a timing controller (TCON)) to sense light signals during emission blanking periods of a display pixel, as illustrated in FIG. 12. Implementing ALS sensing integration during the blanking periods of the display pixel emission may reduce the amount of display back-emission observed by the ALS substantially (e.g., seven to ten times reduction) and thus reduce the display crosstalk. In addition, as previously discussed, this fast sensing integration over short time period windows (e.g., less than 150 microseconds) may accommodate the rapidly changing, dynamic image content displayed on the display. Accordingly, implementing ALS sensing during emission blanking periods with the process 550 may reduce the display crosstalk that need to be compensated by the process 550, which may improve the accuracy of the crosstalk compensation and reduce the time needed to calculate the crosstalk compensation.

At block 704, the processor core complex 18 may generate a heat map for the ALS based on appropriate readings from the ALS, as described above in the paragraphs related to FIG. 15. The heat map may be stored in a storage (e.g., in the memory 20 or the storage device 22). At block 706, the processor core complex 18 may generate an emission mask for the ALS based on related readings from the ALS, as described above in the paragraphs related to FIG. 14. At block 708, the heat map is decomposed and calibrated by using the emission mask to obtain a calibrated the heat map, as illustrated in block 558 of FIG. 16. At block 710, display content is used with the calibrated heat map to calculate a total estimated crosstalk for the ALS, as described above in the paragraphs related to FIG. 15 and block 562 of FIG. 16. At block 712, the total estimated crosstalk may be used as the crosstalk compensation for adjustments of the sensor reading of the ALS.

In addition to the calculation of the crosstalk compensation, the methods discussed above may be used to monitor crosstalk levels. The crosstalk levels may be used to modify the strength of a Harmony algorithm, which depends on the color accuracy of the display. For example, when the crosstalk level is higher, the colors values on the display received by a control circuit associated with the Harmony algorithm may have larger errors. The above method may also be used to suspend a Harmony feature when the crosstalk level is above a predetermined threshold value, which may indicate that the ALS signal error is above specifications. In addition, as the display performance changes with time, the methods discussed above may be used to measure display degradation and update the prediction algorithm display content to display crosstalk.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display comprising:

an active area, wherein the active area comprises one or more self-emissive pixels for displaying display content on the active area; and an ambient light sensor (ALS) located beneath the active area, wherein the ambient light sensor is configured to sense ambient light above the active area during an integration period, wherein the integration period is less than a blanking period of a self-emissive pixel of the one or more self-emissive pixels when emission from the self-emissive pixel is less than a threshold luminance value corresponding to a luminance of the self-emissive pixel at a time after the self-emissive pixel is turned off, wherein the ALS is configured to sense crosstalk light included in a gray band emission mask, wherein the crosstalk light corresponds to one or more gray levels representing respective average amounts of light emissions of the one or more self-emissive pixels produced during the integration period.

2. The electronic display of claim 1, wherein the ALS is located beneath the one or more self-emissive pixels.

3. The electronic display of claim 2, wherein the ALS is configured to receive back-emissions from the one or more self-emissive pixels.

4. The electronic display of claim 3, wherein the ALS is configured to receive an ambient light signal transmitted through the active area.

5. The electronic display of claim 1, wherein the ALS has at least four response channels.

6. The electronic display of claim 5, wherein at least one of the at least four response channels are selected to not cover a peak emission wavelength range of the one or more self-emissive pixels.

7. The electronic display of claim 5, wherein wavelength ranges of the at least four response channels are selected based on a certain standard to recover color tristimulus values from the ambient light.

8. The electronic display of claim 1, wherein the ALS is configured to perform sensing integration and the sensing integration is able to be synchronized with blanking periods of the self-emissive pixel of the one or more self-emissive pixels.

9. The electronic display of claim 1, wherein the active area comprises an open area having an open-ratio above a particular value.

10. The electronic display of claim 1, wherein at least a portion of the crosstalk light is produced by a particular self-emissive pixel during the integration period after a power supply to the particular self-emissive pixel is turned off.

11. A method comprising:

operating an ambient light sensor (ALS) of an electronic display to sense light signals;

generating a heat map for the ALS based on the light signals, wherein the heat map is indicative of optical couplings of each display pixel on the electronic display to the ALS;

generating an emission mask for the ALS based on the light signals, wherein the emission mask is indicative of an average amount of time that light emission of a particular line of display pixels on the electronic display is on during an integration period of the ALS;

calibrating the heat map using the emission mask to generate a calibrated heat map;

calculating a crosstalk compensation for the ALS using the calibrated heat map and display content displayed on the electronic display; and applying the crosstalk compensation to a reading of the ALS.

12. The method of claim 11, comprising:

synchronizing integration periods of the ALS with emission blanking period of a display pixel on the electronic display.

13. The method of claim 12, wherein synchronizing integration periods of the ALS comprises:

starting each integration period of the ALS at a particular time after respective emission blanking period starts, wherein the particular time is associated with a transient behavior of display pixels on the electronic display.

14. The method of claim 11, wherein generating the heat map comprises:

implementing raster scan pattern using adaptive kernels and scanning step sizes, random binary masks, or a 2D basis function, or any combination thereof.

15. The method of claim 11, wherein calibrating the heat map comprises:

decomposing the heat map by using a set of SVD basis vectors; and multiplying the set of SVD basis vectors with the emission mask.

16. The method of claim 11, wherein calculating the crosstalk compensation comprises:

calculating a respective color weighted crosstalk compensation for each color component of the display content; and calculating a respective channel crosstalk compensation for each response channel of the ALS.

17. An electronic device comprising:

an electronic display configured to show display content, wherein the electronic display comprises an active area having one or more display pixels and an ambient light sensor (ALS) located under the active area, wherein the ALS is configured to sense ambient light above the active area during an integration period, wherein the integration period is less than a blanking period of a display pixel of the one or more display pixels when emission from the display pixel of the one or more display pixels is less than a threshold luminance value corresponding to a luminance of the display pixel at a time after turning off a power supply to the display pixel, wherein the ALS is configured to sense crosstalk light included in a gray band emission mask, wherein the crosstalk light corresponds to one or more gray levels representing respective average amounts of light emissions of the one or more display pixels produced during the integration period; and processing circuitry configured to generate a crosstalk compensation for the ALS.

18. The electronic device of claim 17, wherein the processing circuitry generates a heat map for the ALS, wherein the heat map is indicative of optical couplings of each display pixel on the electronic display to the ALS.

19. The electronic device of claim 18, wherein the processing circuitry generates an emission mask for the ALS, wherein the emission mask is indicative of an average amount of time that light emission of a particular line of display pixels on the electronic display is on during an integration period of the ALS.

20. The electronic device of claim 18, wherein the processing circuitry generates a calibrated heat map by decomposing the heat map into a set of SVD basis vectors and using the emission mask to calibrate the set of SVD basis vectors.

21. The electronic device of claim 20, wherein the processing circuitry generates a crosstalk compensation for the ALS based on the calibrated heat map and the display content.

22. The electronic device of claim 17, wherein at least a portion of the crosstalk light is produced by a particular self-emissive pixel during the integration period after a particular power supply to the particular self-emissive pixel is turned off.

* * * * *